(12) United States Patent
Takahashi et al.

(10) Patent No.: US 10,249,914 B2
(45) Date of Patent: Apr. 2, 2019

(54) SECONDARY CELL STATE DETECTOR

(71) Applicant: YAZAKI CORPORATION, Tokyo (JP)

(72) Inventors: Yuichi Takahashi, Shizuoka (JP); Takahiro Syouda, Shizuoka (JP); Nobuyuki Takahashi, Shizuoka (JP); Ayako Saito, Shizuoka (JP); Tsutomu Saigo, Shizuoka (JP); Hironao Fujii, Shizuoka (JP); Jian Wang, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 131 days.

(21) Appl. No.: 15/219,750

(22) Filed: Jul. 26, 2016

(65) Prior Publication Data

US 2017/0033415 A1 Feb. 2, 2017

(30) Foreign Application Priority Data

Jul. 30, 2015 (JP) .................................. 2015-150918

(51) Int. Cl.
*H01M 10/42* (2006.01)
*B60K 6/22* (2007.10)
(Continued)

(52) U.S. Cl.
CPC ........... *H01M 10/4285* (2013.01); *B60K 6/22* (2013.01); *B60L 11/1851* (2013.01);
(Continued)

(58) Field of Classification Search
CPC .............. G01R 31/362; G01R 31/3658; G01R 31/3679; G01R 31/3624; G01R 31/3606
(Continued)

(56) References Cited

U.S. PATENT DOCUMENTS 6,459,236 B2   10/2002  Kawashima
8,841,915 B2*  9/2014   Mizoguchi ......... G01R 31/3658
                                              324/426

(Continued)

FOREIGN PATENT DOCUMENTS

JP     10-225005 A    8/1998
JP    2001-178008 A   6/2001
(Continued)

OTHER PUBLICATIONS

Translation of JP 2014-219311.*
(Continued)

*Primary Examiner* — Christopher P McAndrew
(74) *Attorney, Agent, or Firm* — Kenealy Vaidya LLP

(57) ABSTRACT

One-side plates of first and second condensers are connected to a one-side electrode of one of a plurality of secondary cells. First switches connect the other-side electrode of the secondary cell to the other-side plate of one of the first condenser and the second condenser. An MCU controls the first switches to connect the other-side electrode of the secondary cell to the other-side plate of the first condenser when the plurality of secondary cells is in a first state, and then connect the other-side electrode of the secondary cell to the other-side plate of the second condenser when the plurality of secondary cells is in a second state. A differential amplifier circuit outputs a differential voltage of voltages of the other-side plates of the first condenser and the second condenser. A cell monitoring IC detects states of the secondary cells based on the differential voltage.

6 Claims, 11 Drawing Sheets

(51) Int. Cl.
*H01M 10/48* (2006.01)
*B60L 11/18* (2006.01)
(52) U.S. Cl.
CPC ......... *H01M 10/48* (2013.01); *H01M 10/482* (2013.01); *B60Y 2200/91* (2013.01); *B60Y 2200/92* (2013.01); *B60Y 2400/308* (2013.01); *H01M 2220/20* (2013.01); *Y10S 903/904* (2013.01)
(58) Field of Classification Search
USPC .......................................... 324/426
See application file for complete search history.

(56) References Cited

U.S. PATENT DOCUMENTS

| | | | |
|---|---|---|---|
| 9,300,155 B2 | 3/2016 | Mizoguchi | |
| 2002/0158634 A1* | 10/2002 | Katoh | B60L 11/1851 324/426 |
| 2002/0196025 A1* | 12/2002 | Freeman | G01R 27/02 324/426 |
| 2008/0290877 A1* | 11/2008 | Oh | G01R 31/3658 324/426 |
| 2012/0139545 A1* | 6/2012 | Makihara | G01R 31/362 324/426 |
| 2012/0182019 A1* | 7/2012 | Nakagawara | G01R 31/362 324/426 |
| 2013/0207663 A1* | 8/2013 | Wiesner | G01R 31/3658 324/426 |
| 2014/0147713 A1* | 5/2014 | Mizobe | G01R 31/362 429/90 |
| 2014/0266221 A1* | 9/2014 | Baughman | G01R 31/362 324/426 |
| 2015/0077124 A1* | 3/2015 | Suzuki | G01R 35/00 324/426 |
| 2015/0108990 A1* | 4/2015 | Coenen | G01R 31/026 324/426 |
| 2015/0293179 A1* | 10/2015 | Schipfer | G01R 31/3658 324/426 |

FOREIGN PATENT DOCUMENTS

JP  2014-169913 A  9/2014
JP  2014-219311 A  11/2014

OTHER PUBLICATIONS

Translation of JP 2014-169913.*
Translation of JP 2001-178008.*
Translation of JPH10-225005.*
Japanese Office Action for the related Japanese Patent Application No. 2015-150918 dated Jul. 28, 2017.

* cited by examiner

SECONDARY CELL STATE DETECTOR

CROSS REFERENCE

The present application claims priority to Japanese Patent Application No. 2015-150918 filed Jul. 30, 2015, which is hereby incorporated by reference in its entirety.

BACKGROUND

Technical Field

The present invention relates to a secondary cell state detector that detects a state of an electric cell such as a deterioration degree or an internal resistance of the electric cell.

Related Art

For example, a secondary cell such as a lithium-ion battery or a nickel-metal hydride battery is installed as a power source of an electric motor in various vehicles such as an electric vehicle (EV) driven using an electric motor, and a hybrid electric vehicle (HEV) driven using an engine together with an electric motor.

Such a secondary cell deteriorates through repeated charging and discharging, and a storage capacity (current capacity or power capacity) is known to gradually decrease. In addition, in the EV using the secondary cell, a storage capacity is obtained by detecting a deterioration degree of the secondary cell to calculate a distance at which the EV can be driven by the secondary cell, a life of the secondary cell and the like.

A state of health (SOH) corresponding to a ratio of a current storage capacity to an initial storage capacity is a factor that indicates the deterioration degree of the secondary cell. The SOH is known to have a correlation with the internal resistance of the secondary cell. If the internal resistance of the secondary cell is obtained, the SOH may be detected based on the internal resistance.

For example, a secondary cell state detector described in JP 2014-219311 A is proposed as a device that detects the internal resistance of the secondary cell. The secondary cell state detector of JP 2014-219311 A includes two condensers to hold respective cell voltages of two states of the secondary cell, for example, a discharge state and a discharge suspended state in the condensers, and amplifies a difference between the cell voltages held by the condenser using an amplifier circuit, thereby accurately obtaining an internal resistance or an SOH.

One plate of the two condensers of the above-described secondary cell state detector illustrated in JP 2014-219311 A is connected to ground, and a detection criterion is ground at all times. For this reason, when the secondary cell state detector illustrated in JP 2014-219311 A is applied to detection of states of secondary cells included in an assembled battery without change, a cell voltage of a connected secondary cell on a ground side is included in a measurement result except for a secondary cell closest to ground. Thus, there is a problem that accurate measurement cannot be performed.

Patent Literature 1: JP 2014-219311 A

SUMMARY

In this regard, an object of the invention is to provide a secondary cell state detector capable of accurately detecting states of a plurality of secondary cells included in an assembled battery.

In order to solve the above issue, the invention according to a first aspect is a secondary cell state detector that detects states of a plurality of secondary cells connected to one another in series, and includes: a first condenser and a second condenser, each of which has a one-side plate connected to a one-side electrode of one of the plurality of secondary cells: a first switch that connects the other-side electrode of the secondary cell to the other-side plate of one of the first condenser and the second condenser; a first switch control unit that controls the first switch to connect the other-side electrode of the secondary cell to the other-side plate of the first condenser when the plurality of secondary cells is in a first state, and then connect the other-side electrode of the secondary cell to the other-side plate of the second condenser when the plurality of secondary cells is in a second state; a differential amplifier circuit that outputs a differential voltage of voltages of the other-side plates of the first condenser and the second condenser; and a cell state detecting unit that detects a state of the secondary cell based on the differential voltage.

The invention according to a second aspect is the secondary cell state detector according to the first aspect, further including: second switches for selecting one of the plurality of secondary cells: and a second switch control unit that controls the second switches to connect a one-side electrode of the one selected secondary cell to the one-side plates of both the first condenser and the second condenser, wherein the first switch control unit connects the other-side electrode of the one secondary cell selected by the second switches to the other-side plate of the first condenser when the plurality of secondary cells is in the first state, and then connects the other-side electrode of the one secondary cell selected by the second switches to the other-side plate of the second condenser when the plurality of secondary cells is in the second state.

The invention according to a third aspect is the secondary cell state detector according to the second aspect, further including an equalization unit that equalizes electrode-to-electrode voltages of the plurality of secondary cells by controlling the first switch and the second switches to allow an electric charge to transfer among the plurality of secondary cells using the first condenser or the second condenser.

The invention according to a fourth aspect is the secondary cell state detector according to the second aspect, wherein the second switches have one-side ends connected to the other-side electrodes of the plurality of secondary cells, respectively, and the other-side ends connected in common to the first switch, and the secondary cell state detector further includes: resistors connected between the second switches and the secondary cells, respectively: and an equalization unit that performs equalization by controlling the second switches such that both electrodes of a secondary cell having a high voltage are connected to both ends of the resistor.

The invention according to a fifth aspect is the secondary cell state detector according to the first aspect, wherein a plurality of first condensers and a plurality of second condensers corresponding to the plurality of secondary cells are provided, and a plurality of first switches corresponding to the plurality of secondary cells is provided to connect the other-side electrode of a corresponding secondary cell among the plurality of secondary cells to the other-side plates of the first condenser and the second condenser.

The invention according to a sixth aspect is the secondary cell state detector according to any one of the first to fifth aspects, further including a third switch provided between the first condenser and the second condenser, and the differential amplifier circuit, wherein the first switch control unit controls the first switch while controlling the third switch to disconnect the first condenser and the second condenser from the differential amplifier circuit, and controls the third switch to connect the differential amplifier circuit to the first condenser and the second condenser while disconnecting both plates of the first condenser and the second condenser from the secondary cell.

As described in the foregoing, according to the invention according to the first aspect, both electrodes of one of a plurality of secondary cells are connected to a first condenser and a second condenser, and thus it is possible to accurately detect states of the plurality of secondary cells included in an assembled battery.

According to the invention according to the second aspect, a first condenser and a second condenser may not be provided to correspond to a plurality of secondary cells, and a cost reduction may be attempted.

According to the invention according to the third aspect, equalization may be performed by diverting a first condenser or a second condenser. For this reason, a condenser or first and second switches for performing equalization may not be provided separately from a secondary cell state detector, and a cost reduction may be attempted.

According to the invention according to the fourth aspect, secondary cells may be equalized by diverting a resistor or a second switch. For this reason, a discharge resistor or a switch for performing equalization may not be provided separately from a secondary cell state detector, and a cost reduction may be attempted.

According to the invention according to the fifth aspect, electrode-to-electrode voltages of a plurality of secondary cells may be simultaneously held in corresponding first and second condensers, and thus states of secondary cells may be rapidly and accurately detected.

According to the invention according to the sixth aspect, a secondary cell is not connected to a differential amplifier circuit, and thus it is possible to suppress a demand for performance such as a withstanding pressure on hardware subsequent to the differential amplifier circuit.

DETAILED DESCRIPTION (First Embodiment)

A description will hereinafter be given of a secondary cell state detector in a first embodiment with reference to FIG. 1. For example, a secondary cell state detector 1 of the present embodiment is installed in an electric vehicle (EV) to detect respective states of a plurality of secondary cells Ce1 to Ce4 included in an assembled battery 2 illustrated in FIG. 1 which is included in the EV. The secondary cells Ce1 to Ce4 are connected to one another in series.

Figure 1:
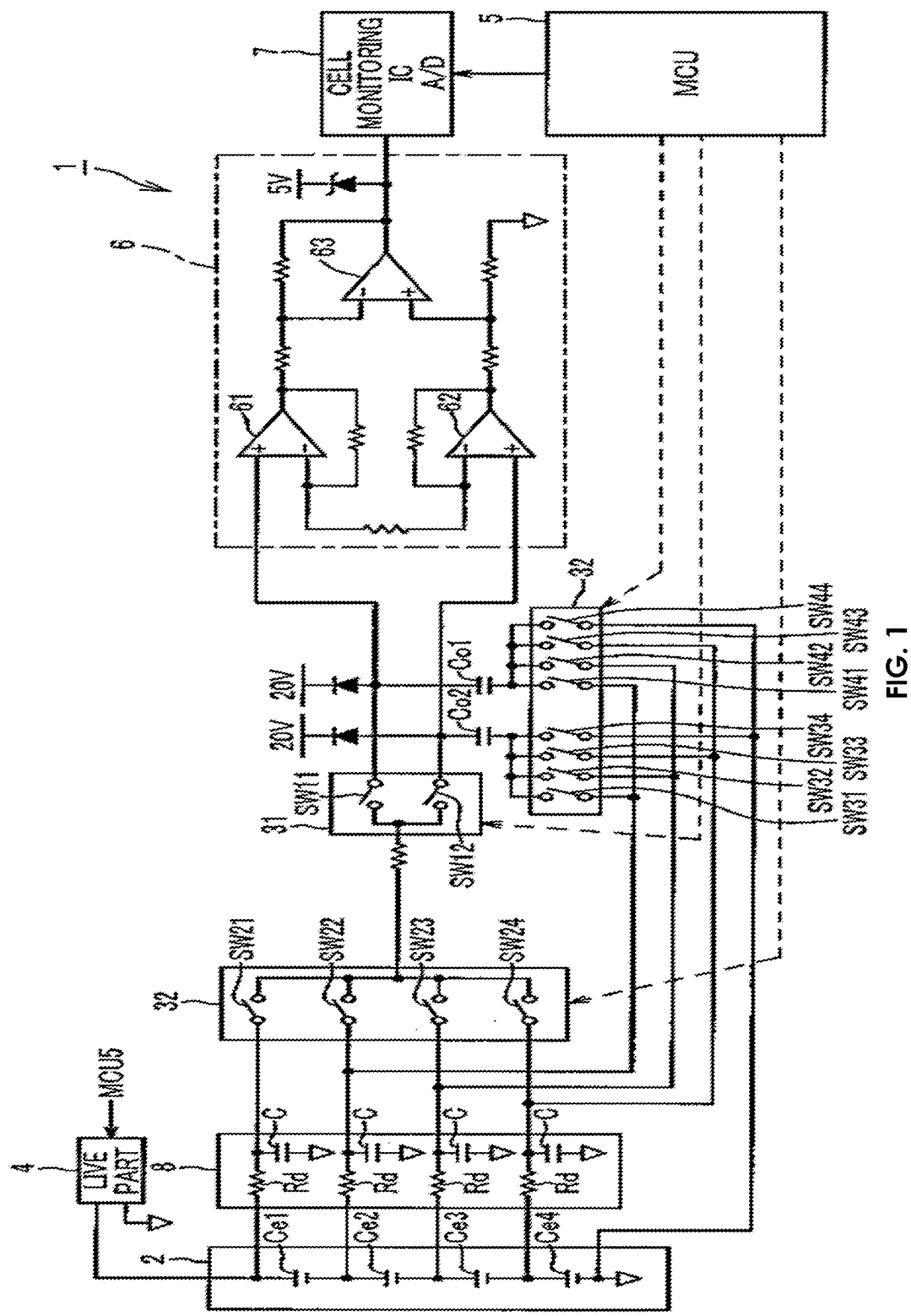
FIG. 1 is a circuit diagram illustrating a secondary cell state detector of the invention in a first embodiment.

As illustrated in FIG. 1, the secondary cell state detector 1 of the first embodiment includes a first condenser Co1, a second condenser Co2, a first switch unit 31, a second switch unit 32, a live part 4, an MCU 5 serving as a first switch control unit and a second switch control unit, a differential amplifier circuit 6, a cell monitoring IC 7 serving as a cell state detecting unit, and a low pass filter unit (hereinafter LPF unit) 8.

Each of the first condenser Co1 and the second condenser Co2 is a condenser for successively holding electrode-to-electrode voltages of the secondary cells Ce1 to Ce4 in two states (for example, a charge state and a charge suspended state). One-side plates of the first condenser Co1 and the second condenser Co2 are connected to one-side negative electrodes (one-side electrodes) of the secondary cells Ce1 and Ce2 selected by the second switch unit 32 described below.

In addition, the other-side plate of the first condenser Co1 is connected to one of two inputs of the differential amplifier circuit 6 described below. The other-side plate of the second condenser Co2 is connected to the other one of the two inputs of the differential amplifier circuit 6 described below.

The first switch unit 31 includes first switches SW11 and SW12 which connect a positive electrode (the other electrode) of one secondary cell Cen (hereinafter, n is an arbitrary integer of 1 to 4) selected by the second switch unit 32 described below to the other-side plate of one of the first condenser Co1 and the second condenser Co2. A one-side end of the first switch SW11 is connected to the other-side plate of the first condenser Co1, and a one-side end of the first switch SW12 is connected to the other-side plate of the second condenser Co2.

The second switch unit 32 includes second switches SW21 to SW24, SW31 to SW34, and SW41 to SW44 for selecting one of the plurality of secondary cells Ce1 to Ce4. The second switches SW21 to SW24 have one-side ends connected to respective positive electrodes of the secondary cells Ce1 and Ce4, and the other-side ends connected in common and connected to the other-side ends of the first switches SW11 and SW12.

The second switches SW31 to SW34 have one-side ends connected to respective negative electrodes of the secondary cells Ce1 and Ce4, and the other-side ends connected to the one-side plate of the second condenser Co2. The second switches SW41 to SW44 have one-side ends connected to the respective negative electrodes of the secondary cells Ce1 and Ce4, and the other-side ends connected to the one-side plate of the first condenser Co1.

Therefore, when second switches SW2n, SW3n, and SW4n are turned ON, a positive electrode of one selected secondary cell Cen is connected to the first switches SW11 and SW12, and a negative electrode of the secondary cell Cen is connected to the respective one-side plates of the first condenser Co1 and the second condenser Co2.

In addition, in a case in which second switches SW2n, SW3n, and SW4n are turned ON, and a secondary cell Cen is selected, the secondary cell Cen is connected to the other-side plate of the first condenser Co1 when the first switch SW11 is turned ON, and the secondary cell Cen is connected to the other-side plate of the second condenser Co2 when the first switch SW12 is turned ON.

The live part 4 is connected to both electrodes of the assembled battery 2, and is configured to be able to allow a predetermined charging current Ic to flow at the time of charging the secondary cells Ce1 to Ce4 included in the assembled battery 2. The live part 4 is connected to the MCU 5 described below. In response to a control signal from the MCU 5, the live part 4 charges the secondary cells Ce1 to Ce4 by allowing the charging current Ic to flow through the secondary cells Ce1 to Ce4 and suspends charging by suspending flowing of the charging current Ic to the secondary cells Ce1 to Ce4.

The MCU 5 includes a microcomputer having a CPU, a ROM, a RAM, and the like which are widely known. The MCU 5 performs on-off control on the first switch unit 31 and the second switch unit 32, and controls the live part 4. The MCU 5 controls the first switch unit 31 and the second switch unit 32 to connect a positive electrode of one secondary cell Cen, which is selected by the second switch unit 32 when the secondary cells Ce1 to Ce4 are in a first state, to the other-side plate of the first condenser Co1, and then connect a positive electrode of one secondary cell Cen, which is selected by the second switch unit 32 when the secondary cells Ce1 to Ce4 are in a second state, to the other-side plate of the second condenser Co2. Herein, the first state and the second state indicate states in which currents flowing through a secondary cell Cen are different from each other. In the present embodiment, a charge state in which the charging current Ic flows through the secondary cell Cen is set as the first state, and a charge suspended state in which no current flows through the secondary cell Cen is set as the second state.

The differential amplifier circuit 6 includes a so-called instrumentation amplifier, and has a first amplifier 61, a second amplifier 62, and a differential amplifier 63. The first amplifier 61 has a non-inverting input connected to the other-side plate of the first condenser Co1, and amplifies a voltage of the other-side plate of the first condenser Co1. The second amplifier 62 has a non-inverting input connected to the other-side plate of the second condenser Co2, and amplifies a voltage of the other-side plate of the second condenser Co2. The differential amplifier 63 amplifies a difference in voltage between the other-side plates of the first and second condensers Co1 and Co2 amplified by the first and second amplifiers 61 and 62, and outputs the difference as a differential voltage.

For example, the cell monitoring IC 7 includes a microcomputer. The cell monitoring IC 7 fetches the differential voltage output from the differential amplifier circuit 6 to detect respective internal resistances of the secondary cells Ce1 to Ce4, thereby detecting states of the secondary cells Ce1 to Ce4. More specifically, in the present embodiment, electrode-to-electrode voltages V1 of the secondary cells Ce1 to Ce4 in the charge state are represented by the following Equation (1).

$$V1 = Ve + r \times Ic \quad (1)$$

Ve: electromotive forces of secondary cells Ce1 to Ce4, r: internal resistance, Ic: charging current Meanwhile, a voltage drop Vr of the internal resistance r in the charge suspended state is 0. In addition, an increase in electromotive force Ve due to charging can be considered to be substantially zero, and thus respective electrode-to-electrode voltages V2 of the secondary cells Ce1 to Ce4 in the charge suspended state are represented by the following Equation (2).

$$V2 = Ve \quad (2)$$

Therefore, the differential voltage output from the differential amplifier circuit 6 becomes a value corresponding to V1−V2=r×Ic. The cell monitoring IC 7 obtains an internal resistance r from the differential voltage.

The LPF unit 8 includes a plurality of LPFs, each of which includes a resistor Rd and a condenser C, and the respective LPFs are provided between the positive electrodes of the secondary cells Ce1 to Ce4 and the second switches SW21 to SW24, respectively.

Figure 2:
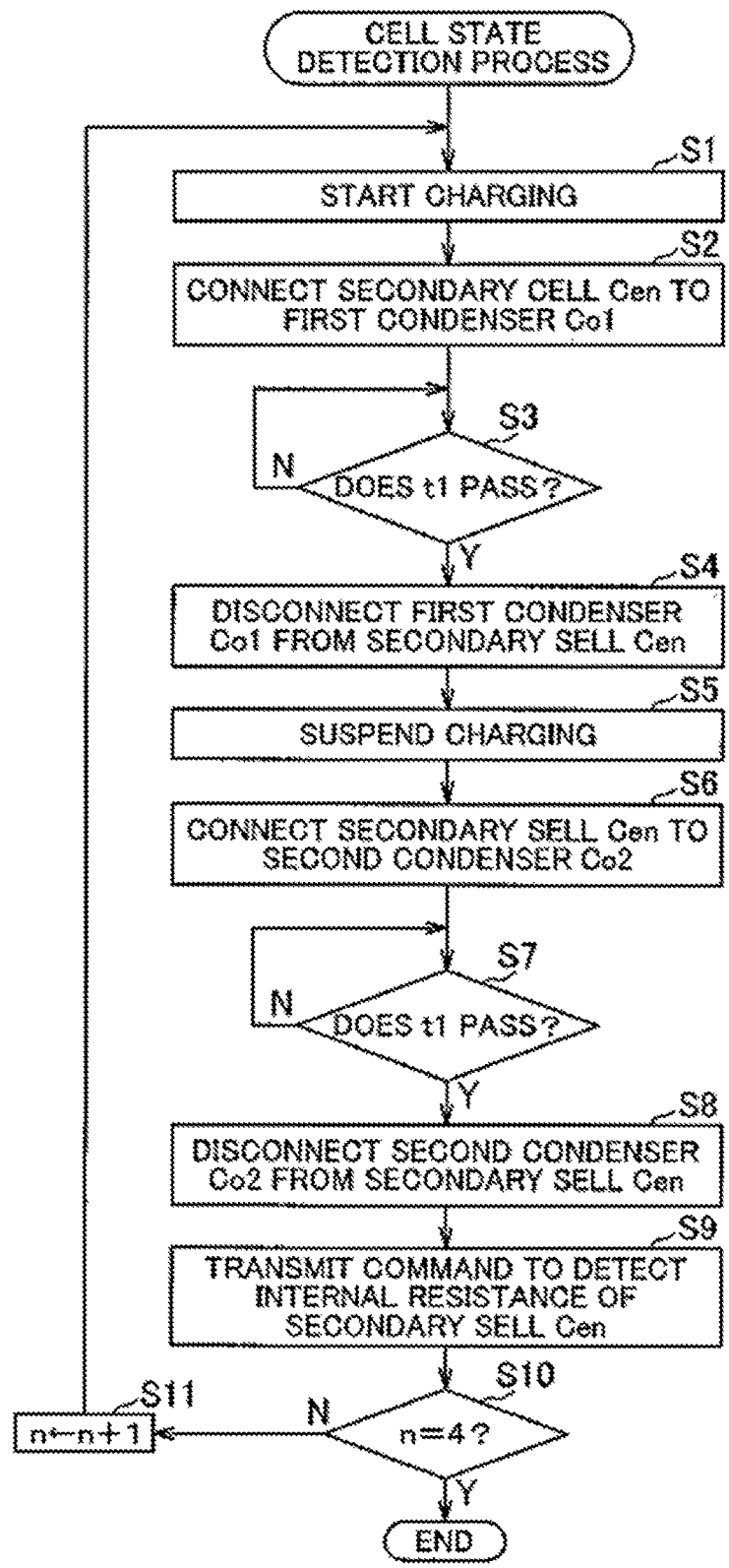
FIG. 2 is a flowchart illustrating a processing procedure of an MCU included in the secondary cell state detector of FIG. 1.

Next, a description will hereinafter be given of an operation of the secondary cell state detector 1 having the above-described configuration with reference to FIG. 2. FIG. 2 is a flowchart illustrating a processing procedure of the MCU 5 included in the secondary cell state detector 1 which is illustrated in FIG. 1.

Upon receiving a command to detect states of the secondary cells Ce1 to Ce4 from an electronic controller installed in the vehicle, the MCU 5 starts a cell state detection process illustrated in FIG. 2. First, the MCU 5 transmits a charge start control signal to the live part 4 (step S1). The live part 4 starts to charge the secondary cells Ce1 to Ce4 with the charging current Ic in response to the control signal.

Subsequently, the MCU 5 turns ON second switches SW2n, SW3n, and SW4n to connect a positive electrode of a selected secondary cell Cen to the first switches SW11 and SW12 and to connect a negative electrode of the selected secondary cell Cen to the one-side plates of the first and second condensers Co1 and Co2. Further, the MCU 5 turns ON the first switch SW11 to connect the positive electrode of the secondary cell Cen to the other-side plate of the first condenser Co1, thereby connecting the both electrodes of the secondary cell Cen to the both plates of the first condenser Co1 (step S2). In an initial state, n=1. In this way, an electrode-to-electrode voltage of the secondary cell Cen in a charge state is held in the first condenser Co1.

Thereafter, when a sufficient time t1, during which a voltage across both plates of the first condenser Co1 reaches the electrode-to-electrode voltage of the secondary cell Cen, passes (Y in step S3), the MCU 5 turns OFF the first switch SW11 to disconnect the first condenser Co1 from the secondary cell Cen (step S4). Thereafter, the MCU 5 transmits a charge suspension control signal to the live part 4 (step S5). The live part 4 suspends charging of the secondary cells Ce1 to Ce4 in response to the control signal.

Subsequently, the MCU 5 turns ON the first switch SW12 to connect the positive electrode of the secondary cell Cen to the other-side plate of the second condenser Co2, thereby connecting the both electrodes of the secondary cell Cen to the both plates of the second condenser Co2 (step S6). In this way, an electrode-to-electrode voltage of the secondary cell Cen in a charge suspended state is held in the second condenser Co2.

Thereafter, when the time t1 passes (Y in step S7), the MCU 5 turns OFF the first switch SW12 to disconnect the second condenser Co2 from the secondary cell Cen (step S8).

Thereafter, the MCU 5 fetches the differential voltage output from the differential amplifier circuit 6, and transmits a command to obtain an internal resistance of the secondary cell Cen to the cell monitoring IC 7 (step S9). In response to this control signal, the cell monitoring IC 7 A/D converts and fetches the differential voltage output from the differential amplifier circuit 6, and obtains the internal resistance of the secondary cell Cen.

Subsequently, when n is not equal to 4 (N in step S10), the MCU 5 increments n (step S11), and then returns to step S1. On the other hand, when n=4 (Y in step S10), the MCU 5 presumes that all internal resistances of the secondary cells Ce1 to Ce4 have been detected, and terminates the cell state detection process.

According to the above-described first embodiment, both electrodes of one of the plurality of secondary cells Ce1 to Ce4 are connected to the first condenser Co1 and the second condenser Co2, and thus it is possible to accurately detect states of the plurality of secondary cells Ce1 to Ce4 included in the assembled battery 2.

In addition, according to the above-described first embodiment, one of the plurality of secondary cells Ce1 to Ce4 is selected and connected to the first condenser Co1 and the second condenser Co2, and thus the first condenser Co1 and the second condenser Co2 may not be provided to correspond to the plurality of secondary cells Ce1 to Ce4, and a cost reduction may be attempted.

In addition, according to the above-described first embodiment, the secondary cells Ce1 to Ce4 are connected to the first and second condensers Co1 and Co2 in order. For this reason, an electric charge transfers from the secondary cells Ce1 to Ce4 corresponding to a high voltage to the secondary cells Ce1 to Ce4 corresponding to a low voltage through the first and second condensers Co1 and Co2. Thus, it is possible to equalize electrode-to-electrode voltages of the secondary cells Ce1 to Ce4. For example, when an electrode-to-electrode voltage of the secondary cell Ce1 is high, and an electrode-to-electrode voltage of the secondary cell Ce2 is low, the first and second condensers Co1 and Co2 are charged by the secondary cell Ce1. Thereafter, when the secondary cell Ce2 is connected to the both plates of the first and second condensers Co1 and Co2, the first and second condensers Co1 and Co2 are discharged, and the secondary cell Ce2 is charged. As a result, an electric charge transfers from the secondary cell Ce1 whose electrode-to-electrode voltage is high to the secondary cell Ce2 whose electrode-to-electrode voltage is low, and equalization of the secondary cells Ce1 to Ce4 may be attempted by repeatedly performing the cell state detection process.

In the above-described first embodiment, electrode-to-electrode voltages of the secondary cells Ce1 to Ce4 in the charge state (first state) and the charge suspended state (second state) are held in the first and second condensers Co1 and Co2, and a differential voltage thereof is obtained. However, the invention is not limited thereto. Electrode-to-electrode voltages of the secondary cells Ce1 to Ce4 in two different states may be held in the first and second condensers Co1 and Co2. For example, electrode-to-electrode voltages of the secondary cells Ce1 to Ce4 in a charge state and a discharge state may be held in the first and second condensers Co1 and Co2. Alternatively, electrode-to-electrode voltages of the secondary cells Ce1 to Ce4 in a charge state in which a large charging current flows and a charge state in which a small charging current flows may be held in the first and second condensers Co1 and Co2. Alternatively, electrode-to-electrode voltages of the secondary cells Ce1 to Ce4 in a discharge state in which a large discharging current flows and a discharge state in which a small discharging current flows may be held in the first and second condensers Co1 and Co2.

In addition, an equalization process may be further performed independently of the above-described cell state detection process. Specifically, an electrode-to-electrode voltage of each of the secondary cells Ce1 to Ce4 is measured, and the MCU 5 functions as an equalization unit and controls the first switch unit 31 and the second switch unit 32 to connect one of the secondary cells Ce1 to Ce4 whose electrode-to-electrode voltage is the highest to the first condenser Co1 or the second condenser Co2, and then connect one of the secondary cells Ce1 to Ce4 whose electrode-to-electrode voltage is the lowest to the first condenser Co1 or the second condenser Co2. Then, equalization may be performed.

(Second Embodiment)

Figure 3:
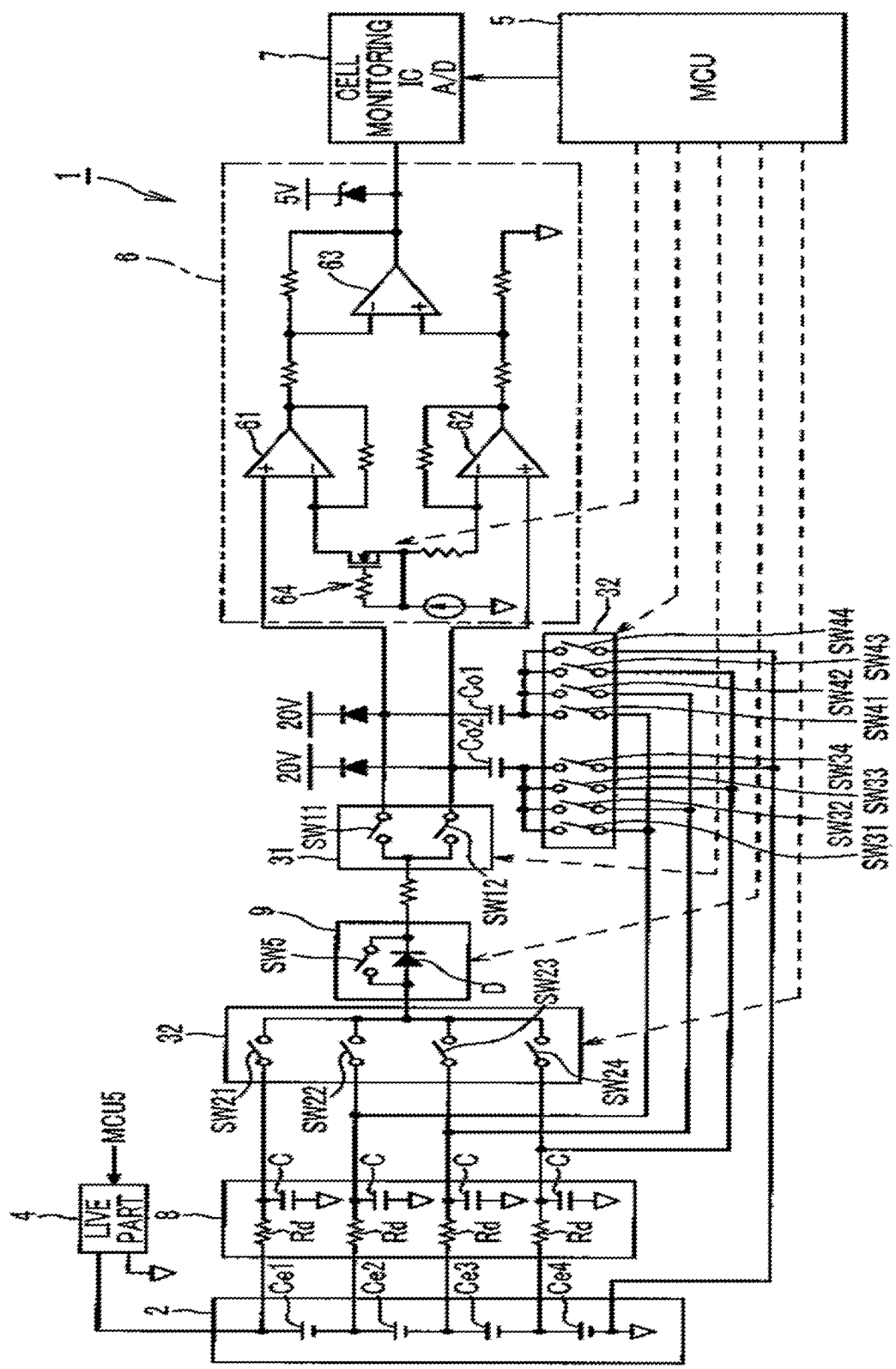
FIG. 3 is a circuit diagram illustrating a secondary cell state detector of the invention in a second embodiment.

Next, a description will be given of a secondary cell state detector 1 of a second embodiment with reference to FIG. 3. A difference between the first embodiment and the second embodiment is that a peak-hold rectifier circuit 9 is provided between second switches SW21 to SW24 and first switches SW11 and SW12.

The peak-hold rectifier circuit 9 includes a diode D and a reset switch SW5 connected to the diode D in parallel. The reset switch SW5 is connected to an MCU 5, and on-off control of the reset switch SW5 is performed by the MCU 5. The peak-hold rectifier circuit 9 is used to hold a peak value of electrode-to-electrode voltages of secondary cells Ce1 to Ce4 in first and second condensers Co1 and Co2 when a discharging current or a charging current corresponding to an alternating current flows. In this way, even when an A/D sampling speed of a cell monitoring IC 7 is slow in comparison with a change rate of the discharging current or the charging current, an internal resistance may be accurately obtained.

In addition, another difference between the first embodiment and the second embodiment is that an amplification factor setting circuit 64 is provided to allow an amplification factor of a differential voltage output from a differential amplifier circuit 6 to vary by allowing a resistance between an inverting input of a first amplifier 61 and an inverting input of a second amplifier 62 to vary. When an optimum amplification factor is set with respect to a magnitude of a differential voltage measured by the amplification factor setting circuit 64, an A/D measurement range may be effectively used, and measurement may be accurately performed even when the magnitude of the differential voltage varies.

(Third Embodiment)

Figure 4:
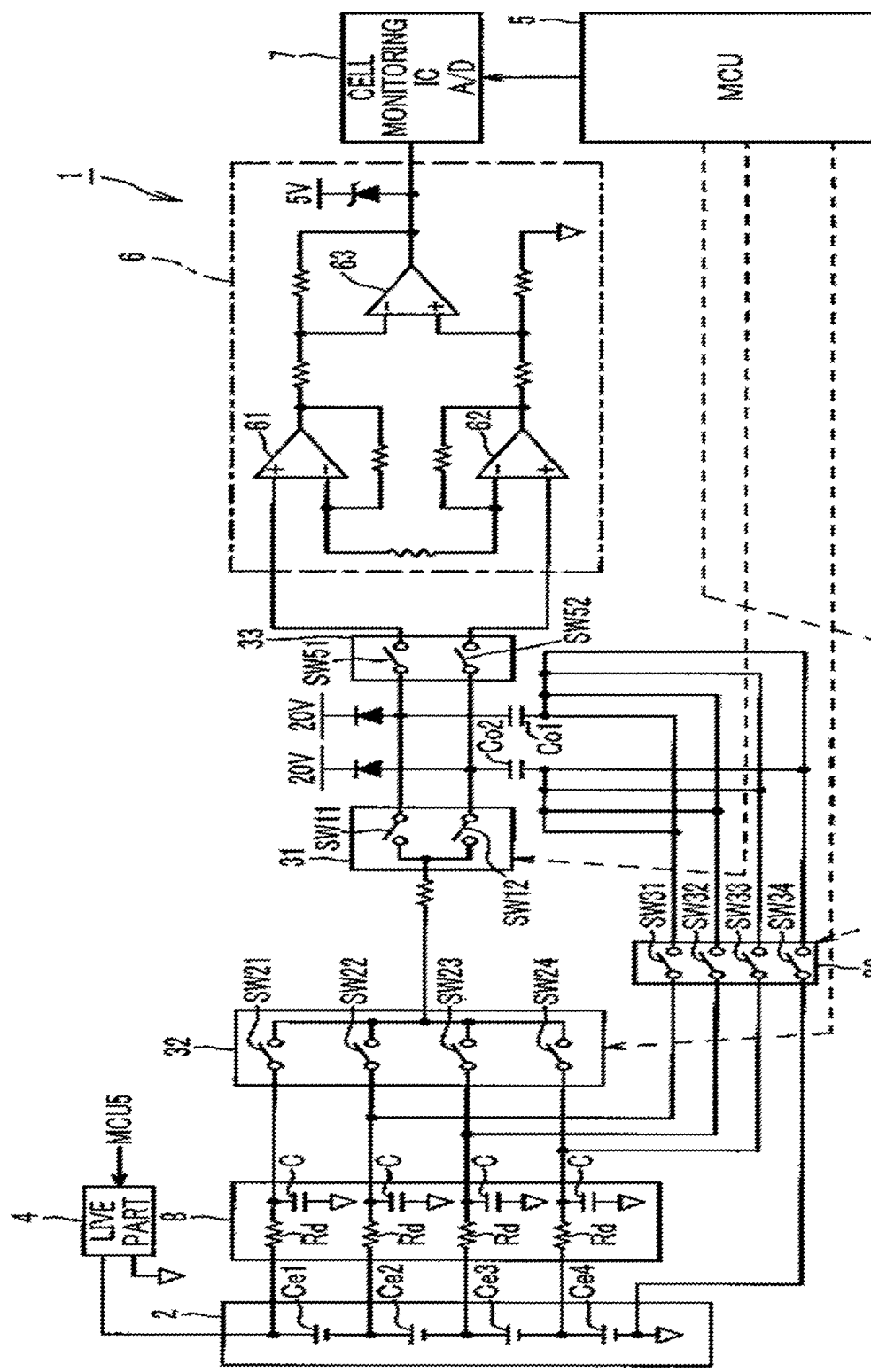
FIG. 4 is a circuit diagram illustrating a secondary cell state detector of the invention in a third embodiment.

Next, a description will be given of a secondary cell state detector 1 of a third embodiment with reference to FIG. 4. A difference between the first embodiment and the third embodiment is that a configuration of a second switch unit 32 and a third switch unit 33 are provided.

The second switch unit 32 includes second switches SW21 to SW24 and SW31 to SW34, and does not include the second switches SW41 to SW44 illustrated in FIG. 1. In the third embodiment, the second switches SW31 to SW34 have one-side ends connected to respective negative electrodes of secondary cells Ce1 to Ce4, and the other-side ends connected to one-side plates of both a first condenser Co1 and a second condenser Co2.

The third switch unit 33 is provided between the first and second condensers Co1 and Co2 and a differential amplifier circuit 6. The third switch unit 33 includes a third switch SW51 provided between the other-side plate of the first condenser Co1 and the differential amplifier circuit 6, and a third switch SW52 provided between the other-side plate of the second condenser Co2 and the differential amplifier circuit 6.

The third switches SW51 and SW52 are connected to an MCU 5, and on-off control of the third switches SW51 and SW52 is performed by the MCU 5. In addition, the MCU 5 controls first and second switch units 31 and 32 to connect the secondary cells Ce1 and Ce2 to the first and second condensers Co1 and Co2 while disconnecting the first condenser Co1 and the second condenser Co2 from the differential amplifier circuit 6 by turning OFF the third switches SW51 and SW52 (that is, performs operation of steps S2 to S8 of FIG. 2). Further, the MCU 5 connects the differential amplifier circuit 6 to the first condenser Co1 and the second condenser Co2 by turning ON the third switches SW51 and SW52 while disconnecting the both plates of the first and second condensers Co1 and Co2 from both electrodes of the secondary cells Ce1 to Ce4 by turning OFF the second switch unit 32, and transmits the command of step S9 of FIG. 2.

According to the above-described third embodiment, the secondary cells Ce1 to Ce4 are not connected to the differential amplifier circuit 6, and thus it is possible to suppress a demand for performance such as a withstanding pressure on hardware subsequent to the differential amplifier circuit 6.

Figure 5:
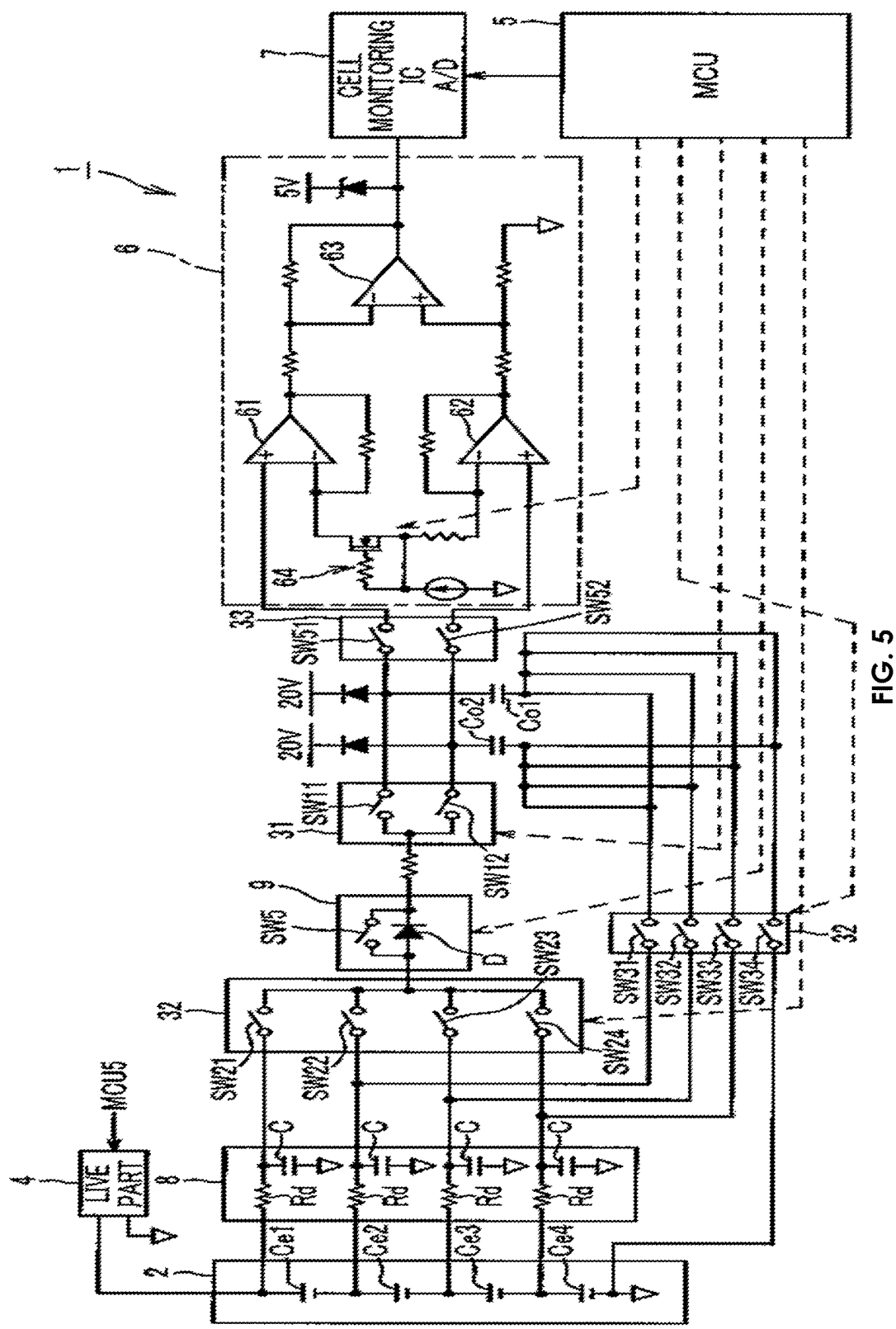
FIG. 5 is a circuit diagram illustrating a secondary cell state detector of the invention in a modified example of the third embodiment.

In this case, as illustrated in FIG. 5, similarly to the second embodiment, a peak-hold rectifier circuit 9 or an amplification factor setting circuit 64 may be provided.

(Fourth Embodiment)

Next, a description will be given of a secondary cell state detector 1 of a fourth embodiment with reference to FIG. 6. In this figure, the same reference numeral is applied to a part equivalent to that of the secondary cell state detector 1 previously described in the first embodiment and illustrated in FIG. 1, and a detailed description thereof will be omitted.

Figure 6:
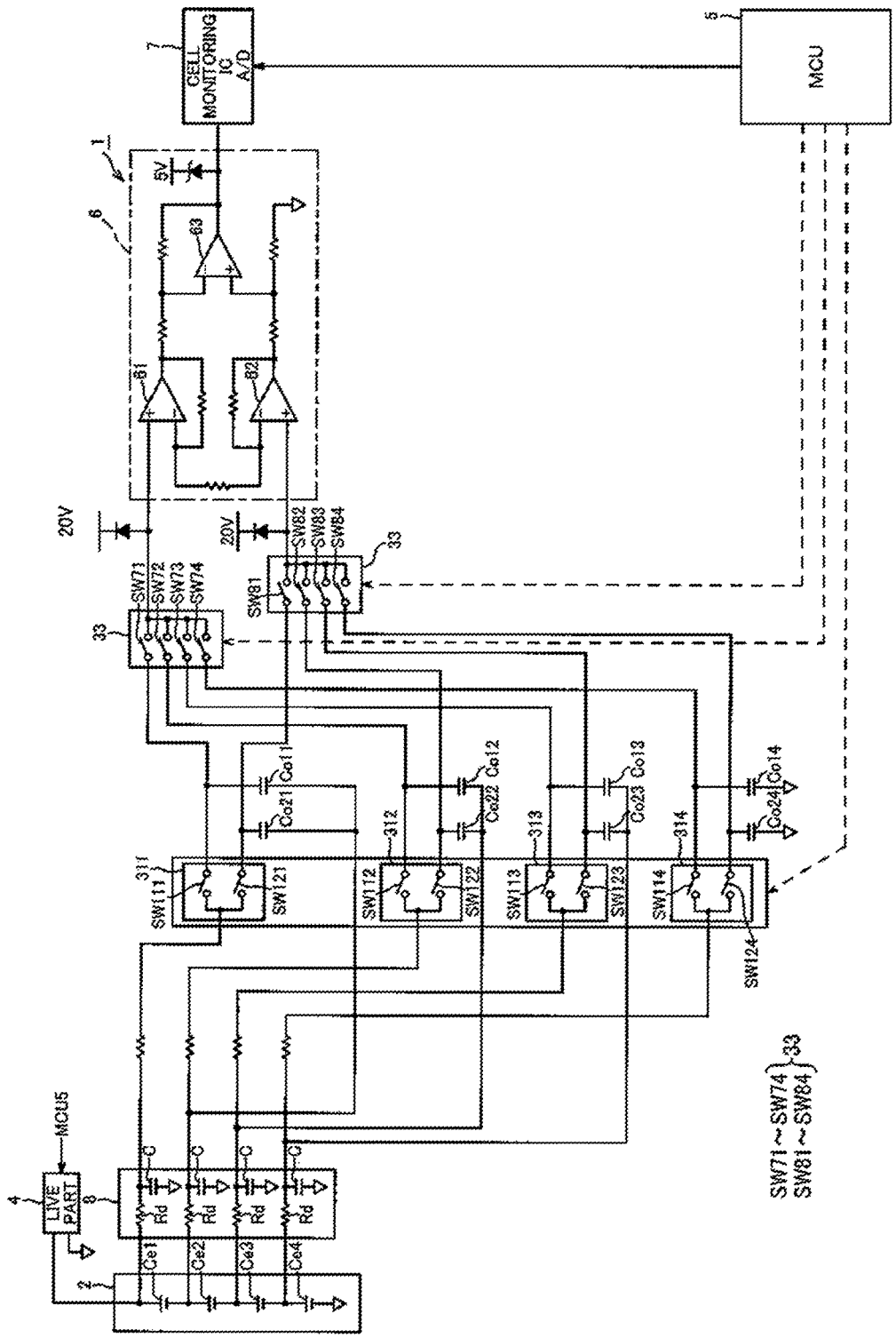
FIG. 6 is a circuit diagram illustrating a secondary cell state detector of the invention in a fourth embodiment.

As illustrated in FIG. 6, the secondary cell state detector 1 of the fourth embodiment includes a plurality of first condensers Co11 to Co14 and second condensers Co21 to Co24, first switch units 311 to 314, a third switch unit 33, a live part 4, an MCU 5, a differential amplifier circuit 6, a cell monitoring IC 7, and an LPF unit 8.

The plurality of first condensers Co11 to Co14 and second condensers Co21 to Co24 are provided to correspond to respective secondary cells Ce1 to Ce4, and each of the number of the first condensers Co11 to Co14 and the number of the second condensers Co21 to Co24 is the same as the number of the secondary cells Ce1 to Ce4. One-side plates of first and second condensers Co1n and Co2n are connected in common, and are connected to a negative electrode of a secondary cell Cen.

The plurality of first switch units 311 to 314 is provided to correspond to the plurality of secondary cells Ce1 to Ce4, and the number of the respective first switch units 311 to 314 is the same as the number of the secondary cells Ce1 to Ce4. An arbitrary first switch unit 31n includes first switches SW11n and SW12n which connect a positive electrode of a corresponding secondary cell Cen to the other-side plate of one of a corresponding first condenser Co1n and a corresponding second condenser Co2n.

First switches SW11n and SW12n have one-side ends connected to the other-side plates of the first and second condensers Co1n and Co2n, respectively, and the other-side ends connected in common and connected to a positive electrode of a secondary cell Cen.

According to the above configuration, when a first switch SW11n is turned ON, a positive electrode of a corresponding secondary cell Cen is connected to the other-side plate of a first condenser Co1n. When a first switch SW12n is turned ON, a positive electrode of a corresponding secondary cell Cen is connected to the other-side plate of a second condenser Co2n.

The third switch unit 33 includes third switches SW71 to SW74 and third switches SW81 to SW84 provided between the first condensers Co11 to Co14 and the second condensers Co21 to Co24, and the differential amplifier circuit 6.

The third switches SW71 to SW74 have one-side ends connected to the other-side plates of the first condensers Co11 to Co14, respectively, and the other-side ends connected in common and connected to the differential amplifier circuit 6. The third switches SW81 to SW84 have one-side ends connected to the other-side plates of the second condensers Co21 to Co24, respectively, and the other-side ends connected in common and connected to the differential amplifier circuit 6.

The live part 4, the MCU 5, MCU differential amplifier circuit 6, MCU cell monitoring IC 7 and MCU LPF unit 8 are equivalent to those of FIG. 1 described in the above first embodiment, and thus a detailed description thereof will be omitted.

Figure 7:
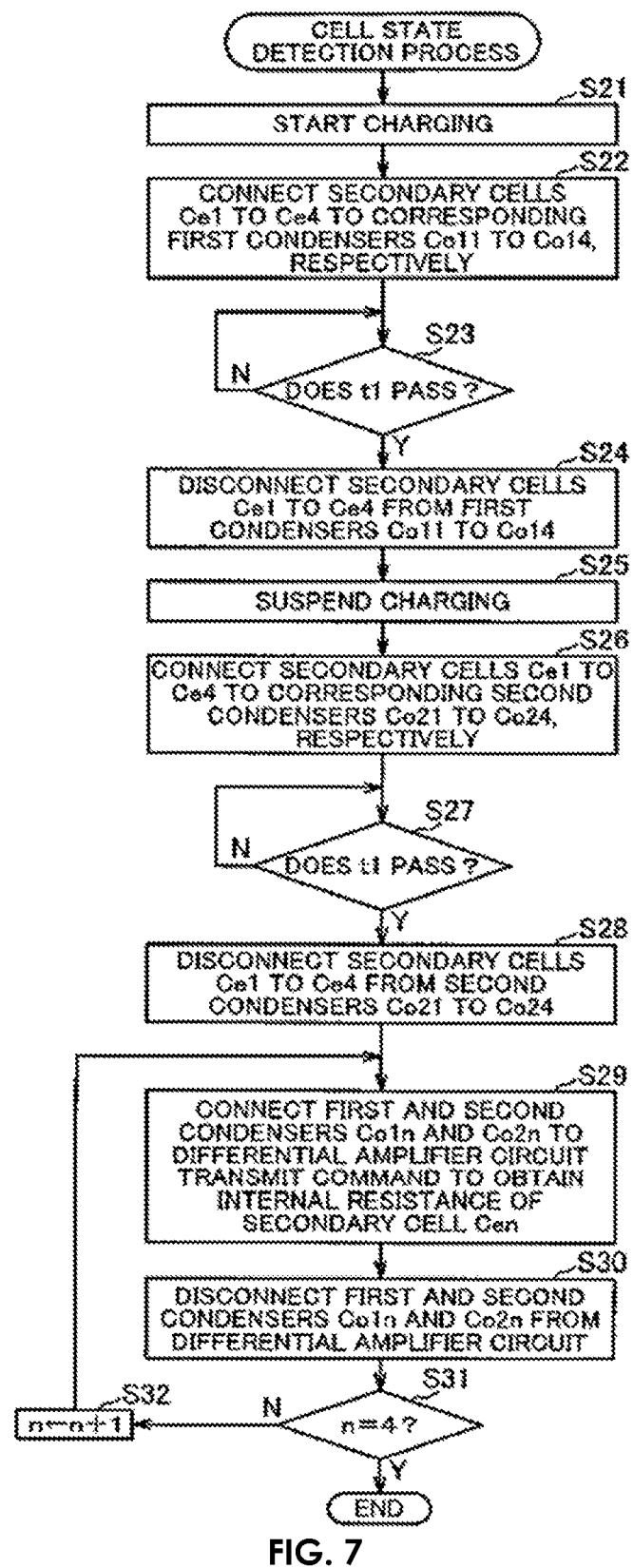
FIG. 7 is a flowchart illustrating a processing procedure of an MCU included in the secondary cell state detector of FIG. 6.

Next, a description will hereinafter be given of operation of the secondary cell state detector 1 having the above-described configuration with reference to FIG. 7. FIG. 7 is a flowchart illustrating a processing procedure of the MCU 5 included in the secondary cell state detector 1 which is illustrated in FIG. 6.

Upon receiving a command to detect states of the secondary cells Ce1 to Ce4 from an electronic controller installed in a vehicle, the MCU 5 starts a cell state detection process illustrated in FIG. 7. First, the MCU 5 transmits a charge start control signal to the live part 4 (step S21). The live part 4 starts to charge the secondary cells Ce1 to Ce4 with a charging current Ic in response to the control signal.

In an initial state, all of the first switch units 311 to 314 and the third switch unit 33 are turned OFF. Subsequently, the MCU 5 turns ON the first switches SW111 to SW114 to connect positive electrodes of the secondary cells Ce1 to Ce4 to the other-side plates of the corresponding first condensers Co11 to Co14 (step S22). In this way, electrode-to-electrode voltages of the secondary cells Ce1 to Ce4 in a charge state are held in the first condensers Co11 to Co14, respectively.

Thereafter, when a time t1 passes (Y in step S23), the MCU 5 turns OFF the first switches SW111 to SW114 to disconnect the secondary cells Ce1 to Ce4 from the first condensers Co11 to Co14 (step S24). Thereafter, the MCU 5 transmits a charge suspension control signal to the live part 4 (step S25). The live part 4 suspends charging of the secondary cells Ce1 to Ce4 in response to this control signal.

Subsequently, the MCU 5 turns ON the first switches SW121 to SW124 to connect the positive electrodes of the secondary cells Ce1 to Ce4 to the other-side plates of the corresponding second condensers Co21 to Co24 (step S26). In this way, electrode-to-electrode voltages of the secondary cells Ce1 to Ce4 in a charge suspended state are held in the second condensers Co21 to Co24. Thereafter, when the time t1 passes (Y in step S27), the MCU 5 turns OFF the first switches SW121 to SW124 to disconnect the secondary cells Ce1 to Ce4 from the second condensers Co21 to Co24 (step S28).

Subsequently, the MCU 5 turns ON a switch SW7n and a switch SW8n to connect a first condenser Co1n and a second condenser Co2n to the differential amplifier circuit 6. Further, the MCU 5 fetches a differential voltage output from the differential amplifier circuit 6, and transmits a command to obtain an internal resistance of a secondary cell Cen to the cell monitoring IC 7 (step S29). Thereafter, the MCU 5 turns OFF the switch SW7n and the switch SW8n to disconnect the first condenser Co1n and the second condenser Co2n from the differential amplifier circuit 6 (step S30). Subsequently, when n is not equal to 4 (N in step S31), the MCU 5 increments n (step S32), and then returns to step S29. On the other hand, when n=4 (Y in step S31), the MCU 5 terminates the cell state detection process.

According to the above-described fourth embodiment, the first condensers Co11 to Co14 and the second condensers Co21 to Co24 corresponding to the plurality of respective secondary cells Ce1 to Ce4 are provided, and both electrodes of the corresponding secondary cells Ce1 to Ce4 are simultaneously connected to the respective first condensers Co1 to Co14 and second condensers Co21 to Co24, and thus it is possible to rapidly detect internal resistances (states) of the plurality of secondary cells Ce1 to Ce4.

(Fifth Embodiment)

Figure 8:
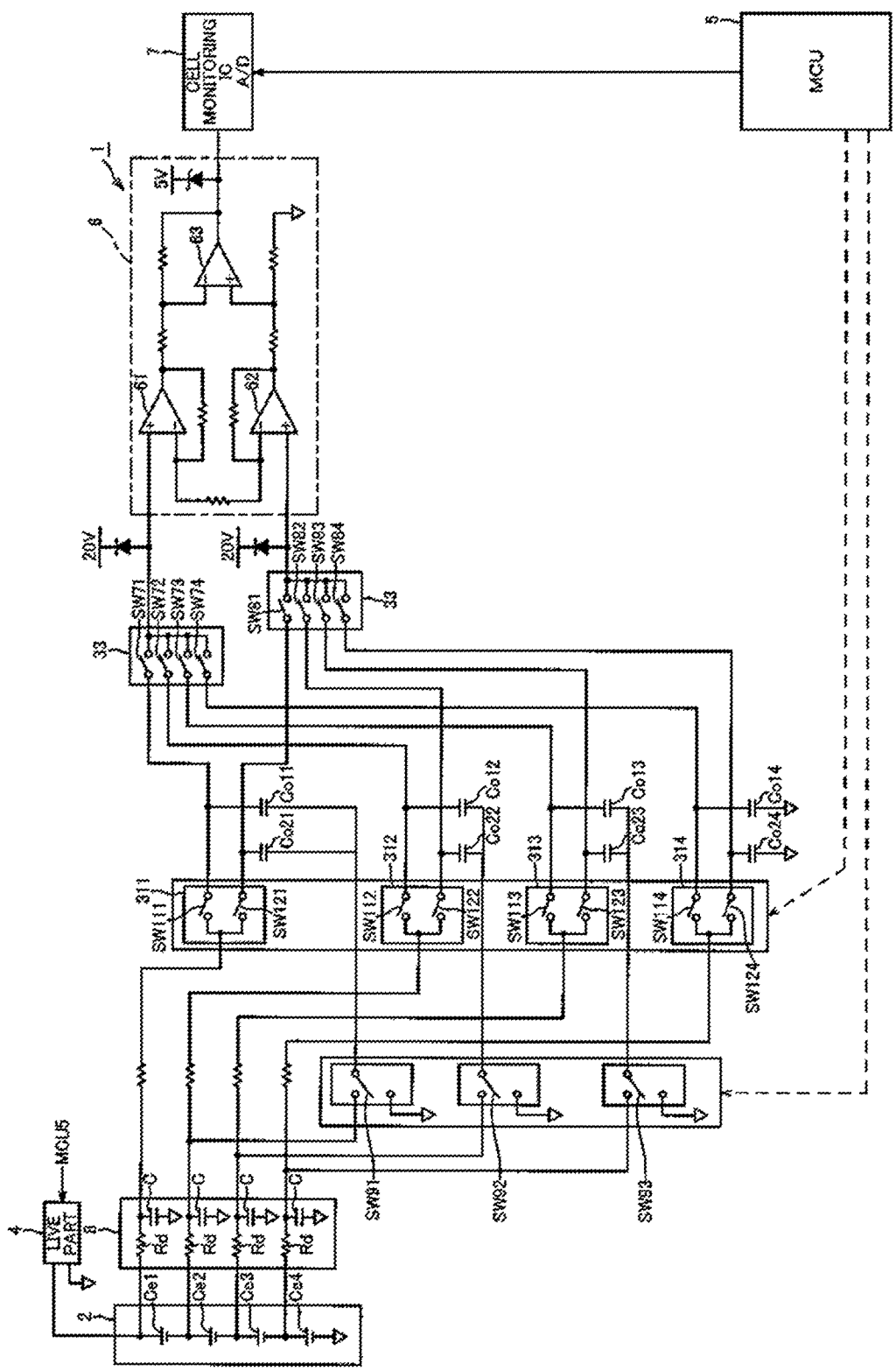
FIG. 8 is a circuit diagram illustrating a secondary cell state detector of the invention in a fifth embodiment.

Next, a description will be given of a secondary cell state detector 1 of a fifth embodiment with reference to FIG. 8. A difference between the fourth embodiment and the fifth embodiment is that switches SW91 to SW93 are provided to disconnect both electrodes of secondary cells Ce1 to Cen from both plates of the first and second condensers Co11 to Co14 and Co21 to Co24.

A switch SW9n is a change-over switch connected between one-side plates of first and second condensers Co1n and Co2n and a negative electrode of a secondary cell Cen to switch connection of the one-side plates of first and second condensers Co1n and Co2n between the negative electrode of the secondary cell Cen and ground. When the switches SW91 to SW93 are provided, the both plates of the first and second condensers Co11 to Co14 and Co21 to Co24 may be disconnected from the secondary cells Ce1 to Ce4.

In addition, the MCU 5 turns ON the switches SW91 to SW93 to connect one-side plates of first and second condensers Co1 to Co14 and Co21 to Co24 to respective negative electrodes of secondary cells Ce1 to Cen while turning OFF a third switch unit 33 to disconnect the first condensers Co11 to Co14 and the second condensers Co21 to Co24 from a differential amplifier circuit 6. In this state, the MCU 5 controls first switch units 311 to 314 to hold electrode-to-electrode voltages of the secondary cells Ce1 to Ce4 in the first and second condensers Co11 to Co14 and Co21 to Co24 (that is, performs operation of steps S22 to S28 of FIG. 7).

Further, the MCU 5 turns OFF the first switch units 311 to 314 and the switches SW91 to SW93 to connect the one-side plates of the first and second condensers Co11 to Co14 and Co21 to Co24 to ground and disconnect the both plates of the first and second condensers Co11 to Co14 and Co21 to Co24 from the secondary cells Ce1 to Ce4. In this state, the MCU 5 controls the third switch unit 33 to successively connect the first condensers Co11 to Co14 and the second condensers Co21 to Co24 to the differential amplifier circuit 6 (that is, performs operation of steps S29 and S30 of FIG. 7).

According to the above-described fifth embodiment, the secondary cells Ce1 to Ce4 are not connected to the differential amplifier circuit 6, and thus it is possible to suppress a demand for performance such as a withstanding pressure on hardware subsequent to the differential amplifier circuit 6.

(Sixth Embodiment)

Figure 9:
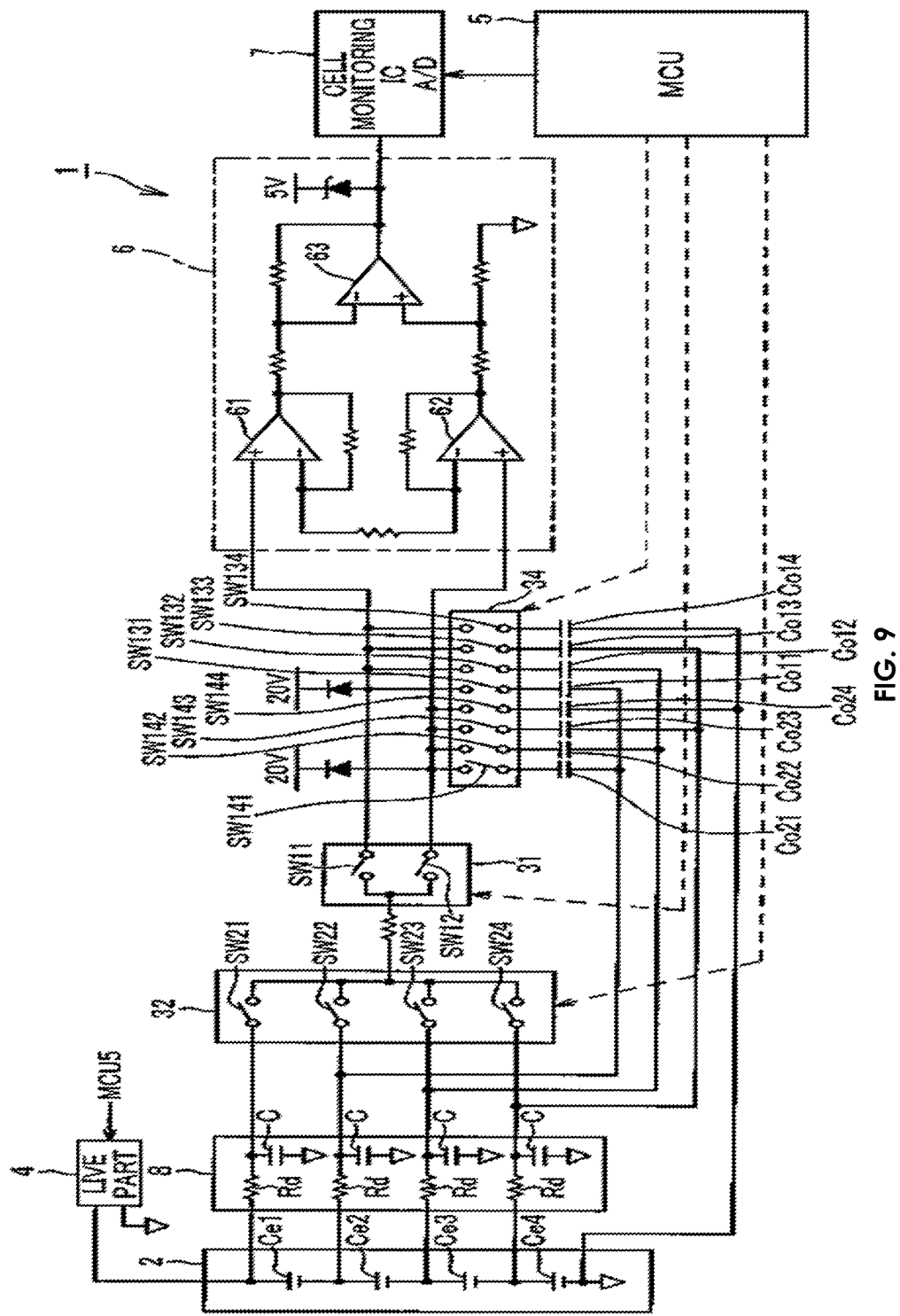
FIG. 9 is a circuit diagram illustrating a secondary cell state detector of the invention in a sixth embodiment.

Next, a description will be given of a secondary cell state detector 1 of a sixth embodiment with reference to FIG. 9. A difference between the sixth embodiment and the fourth embodiment is that a first switch unit 31, a second switch unit 32, and a fourth switch unit 34 for selecting one of first condensers Co11 to Co14 and second condensers Co21 to Co24 are provided in place of the plurality of first switch units 311 to 314 and the third switch unit 33.

The first and second switch units 31 and 32 are equivalent to the first and second switch units 31 and 32 previously described in the first embodiment and illustrated in FIG. 1, and thus a detailed description will be omitted here. One-side plates of first and second condensers Co1n and Co2n are connected to a negative electrode of a corresponding secondary cell Cen. In addition, the other-side plate of the first condenser Co1n is connected to a first switch SW11 through the fourth switch unit 34 described below, and the other-side plate of the second condenser Co2n is connected to a first switch SW12 through the fourth switch unit 34 described below.

The fourth switch unit 34 includes fourth switches SW131 to SW134 provided between the first switch SW11 and the other-side plates of the first condensers Co11 to Co14, respectively; and fourth switches SW141 to SW144 provided between the first switch SW12 and the other-side plates of the second condensers Co21 to Co24, respectively.

According to the above-described configuration, a positive electrode of one selected secondary cell Cen is connected to the first switches SW11 and SW12 when a second switch SW2n is turned ON, and a pair of selected first and second condensers Co1n and Co2n is connected to the first switches SW11 and SW12 when fourth switches SW13n and SW14n are turned ON. Therefore, when one of the first switches SW11 and SW12 is turned ON, a positive electrode (the other electrode) of one secondary cell Cen selected by the second switch unit 32 may be connected to one of a first condenser Co1n and a second condenser Co2n selected by the fourth switch unit 34.

Figure 10:
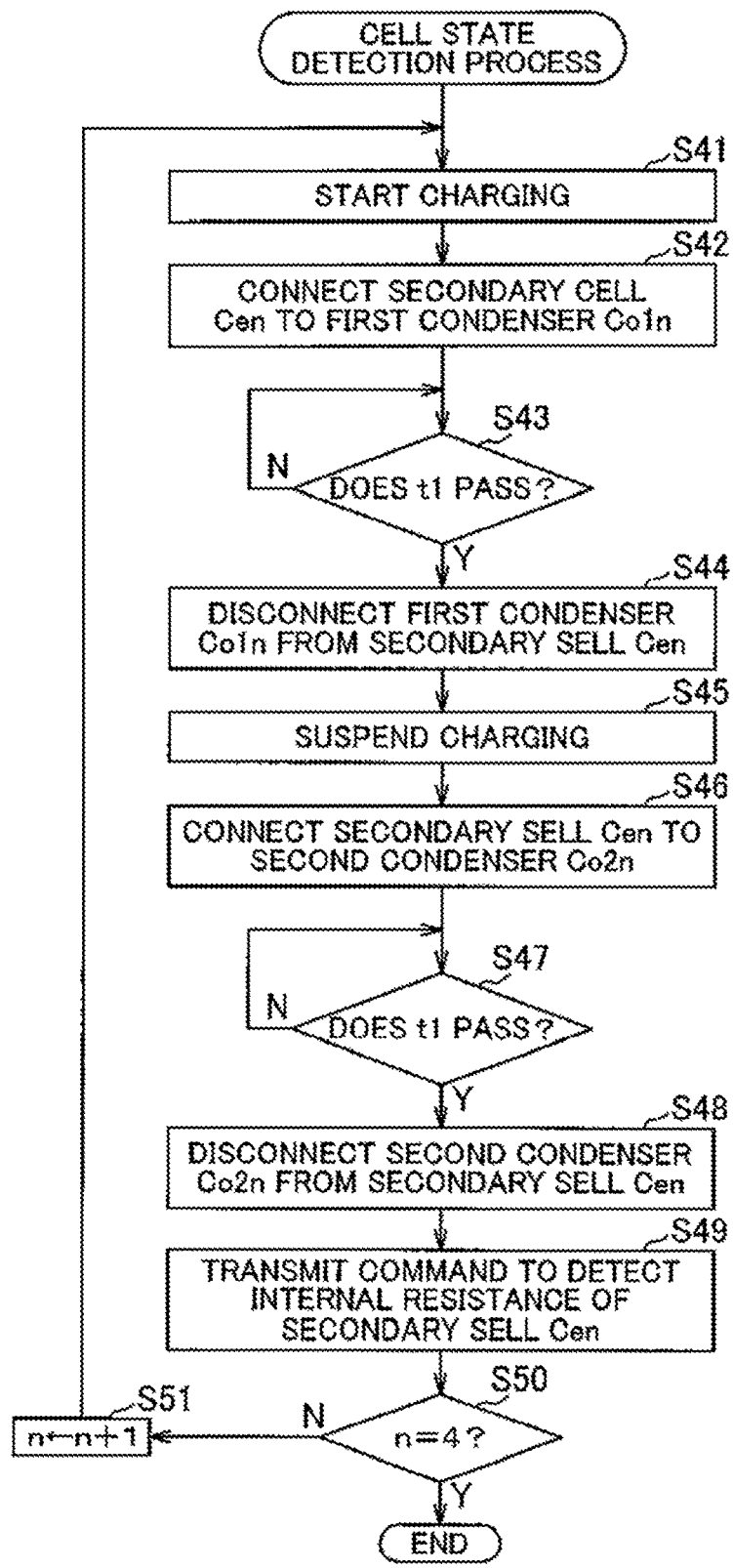
FIG. 10 is a flowchart illustrating a processing procedure of an MCU included in the secondary cell state detector of FIG. 9.

Next, a description will hereinafter be given of operation of the secondary cell state detector 1 having the above-described configuration with reference to FIG. 10. FIG. 10 is a flowchart illustrating a processing procedure of an MCU 5 included in the secondary cell state detector 1 which is illustrated in FIG. 9.

Upon receiving a command to detect states of secondary cells Ce1 and Ce2 from an electronic controller installed in a vehicle, the MCU 5 starts a cell state detection process illustrated in FIG. 10. First, the MCU 5 transmits a charge start control signal to a live part 4 (step S41). The live part 4 starts to charge secondary cells Ce1 to Ce4 with a charging current Ic in response to the control signal.

Subsequently, the MCU 5 turns ON a second switch SW2n and fourth switches 13n and 14n to connect a positive electrode of a selected secondary cell Cen to the first switches SW11 and SW12 and connect the other-side plates of selected first and second condensers Co1n and Co2n to the first switches SW11 and SW12. Further, the MCU 5 turns ON the first switches SW11 to connect the positive electrode of the secondary cell Cen to the other-side plate of the first condenser Co1n, thereby connecting both electrodes of the secondary cell Cen to both plates of the first condenser Co1n (step S42). In this way, an end-to-end voltage of the secondary cell Cen in a charge state is held in the first condenser Co1n.

Thereafter, when a time t1 passes (Y in step S43), the MCU 5 turns OFF the first switch SW11 to disconnect the first condenser Co1n from the secondary cell Cen (step S44). Thereafter, the MCU 5 transmits a charge suspension control signal to the live part 4 (step S45). The live part 4 suspends charging of the secondary cells Ce1 to Ce4 in response to the control signal.

Subsequently, the MCU 5 turns ON the first switch SW12 to connect the positive electrode of the secondary cell Cen to the other-side plate of the second condenser Co2n, thereby connecting the both electrodes of the secondary cell Cen to both plates of the second condenser Co2n (step S46). In this way, the end-to-end voltage of the secondary cell Cen in a charge suspended state is held in the second condenser Co2n.

Thereafter, when the time t1 passes (Y in step S47), the MCU 5 turns OFF the first switch SW12 to disconnect the second condenser Co2n from the secondary cell Cen (step S48).

Thereafter, the MCU 5 fetches a differential voltage output from a differential amplifier circuit 6, and transmits a command to obtain an internal resistance of the secondary cell Cen to a cell monitoring IC 7 (step S49).

Subsequently, when n is not equal to 4 (N in step S50), the MCU 5 increments n (step S51), and then returns to step S. On the other hand, when n=4 (Y in step S50), the MCU 5 terminates the cell state detection process.

According to the above-described sixth embodiment, similarly to the fourth embodiment, the first condensers Co11 to Co14 and the second condensers Co21 to Co24 corresponding to the plurality of respective secondary cells Ce1 to Ce4 are provided, and both side-ends of the corresponding secondary cells Ce1 to Ce4 are connected to the respective first condensers Co11 to Co14 and second condensers Co21 to Co24. Thus, it is possible to accurately detect internal resistances (states) of the plurality of secondary cells Ce1 to Ce4 which are included in an assembled battery 2.

(Seventh Embodiment)

Figure 11:
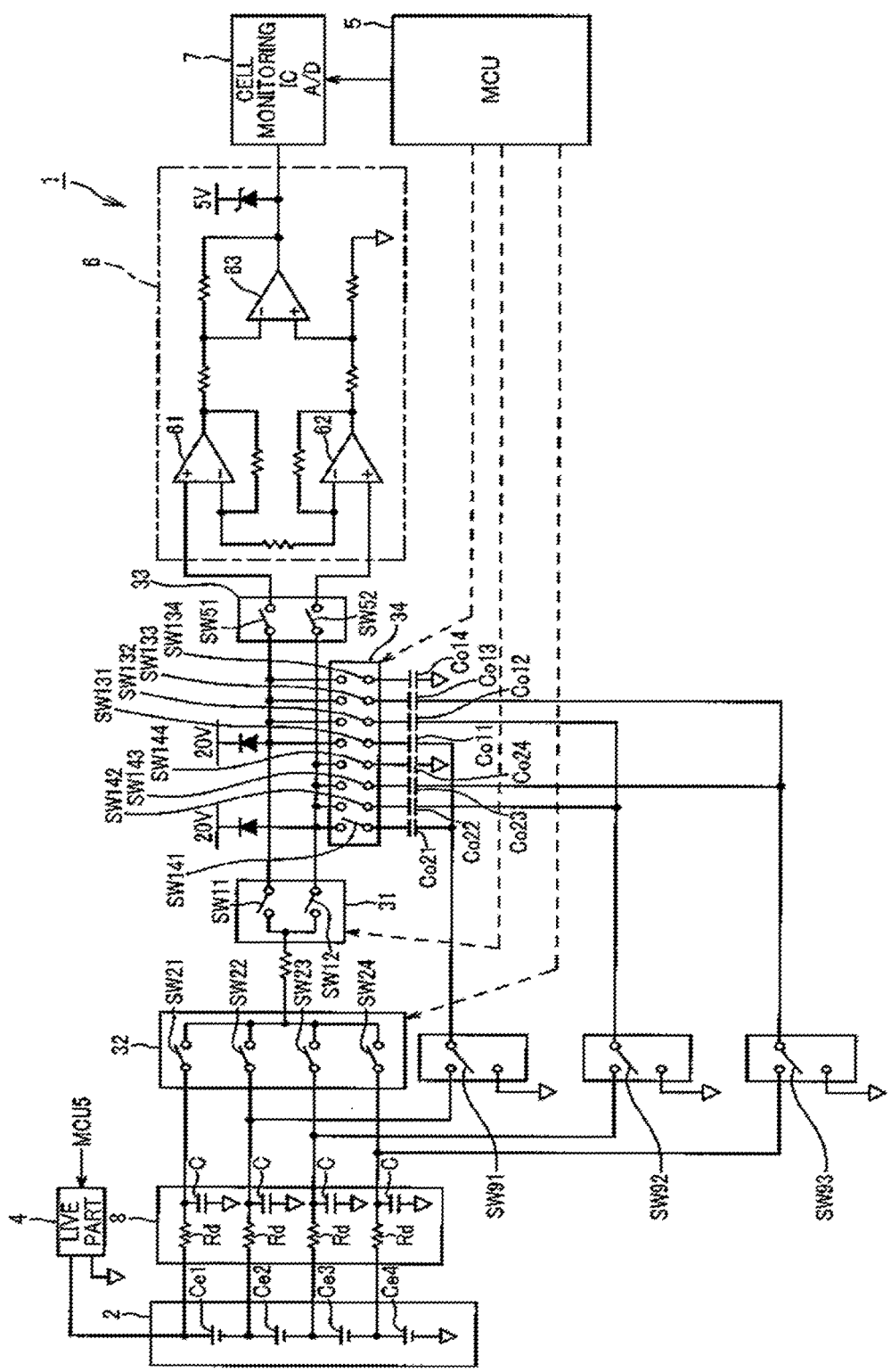
FIG. 11 is a circuit diagram illustrating a secondary cell state detector of the invention in a seventh embodiment.

Next, a description will be given of a secondary cell state detector 1 of a seventh embodiment with reference to FIG. 11. A difference between the sixth embodiment and the seventh embodiment is that a third switch unit 33 and switches SW91 to SW93 for disconnecting both electrodes of secondary cells Ce1 to Cen from both plates of first and second condensers Co11 to Co14 and Co21 to Co24 are provided.

The third switch unit 33 is equivalent to the third switch unit 33 of FIG. 5 previously described in the third embodiment, and thus a detailed description will be omitted here. The switches SW91 to SW93 are equivalent to the switches SW91 to SW93 previously described in the fourth embodiment and illustrated in FIG. 8, and thus a detailed description will be omitted here.

In addition, an MCU 5 turns ON the switches SW91 to SW93 to connect one-side plates of first and second condensers Co11 to Co14 and Co21 to Co24 to respective negative electrodes of secondary cells Ce1 to Cen while turning OFF the third switch unit 33 to disconnect the first condensers Co11 to Co14 and the second condensers Co21 and Co22 from a differential amplifier circuit 6. In this state, the MCU 5 controls a first switch unit 31 and a second switch unit 32 to hold electrode-to-electrode voltages of secondary cells Ce1 to Ce4 in the first condensers Co11 to Co14 and the second condensers Co21 to Co24 (that is, performs operation of steps S42 to S48 of FIG. 10).

Further, the MCU 5 turns OFF the first switch unit 31 and the switches SW91 to SW93 to connect one-side plates of the first and second condensers Co11 to Co14 and Co21 to Co24 to ground and disconnect both plates of the first and second condensers Co1 to Co14 and Co21 to Co24 from the secondary cells Ce1 to Ce4. In this state, the MCU 5 controls the third switch unit 33 and a fourth switch unit 34 to successively connect the first condensers Co11 to Co14 and the second condensers Co21 to Co24 to the differential amplifier circuit 6 (that is, performs operation of step S49 of FIG. 10).

According to the above-described seventh embodiment, the secondary cells Ce1 to Ce4 are not connected to the differential amplifier circuit 6, and thus it is possible to suppress a demand for performance such as a withstanding pressure on hardware subsequent to the differential amplifier circuit 6.

(Eighth Embodiment)

Further, as in FIGS. 1 to 5, FIG. 9, and FIG. 11, when one of the first condensers Co1 and Co11 to Co14 and the second condensers Co2 and Co21 to Co24 is selected by the first switches SW11 and SW12, one of the secondary cells Ce1 to Ce4 is selected by the second switches SW21 to SW24, and the selected condenser and the selected secondary cell are allowed to be connected to each other, the second switches SW21 to SW24 and the resistor Rd included in the LPF unit 8 may be diverted to discharge type equalization.

That is, end-to-end voltages of the secondary cells Ce1 to Ce4 are measured, and the MCU 5 controls the second switches SW21 to SW24 to connect the resistor Rd to both ends of one of the secondary cells Ce1 to Ce4 having a high voltage, thereby discharging the secondary cell. For example, when an end-to-end voltage of the secondary cell Ce1 is high, the MCU 5 turns ON the second switches SW21 and SW22 to connect the resistor Rd to both ends of the secondary cell Ce1.

According to the above-described eighth embodiment, the resistor Rd of the LPF or the second switches SW21 to SW24 included in the first switch unit 31 may be diverted to equalization of the secondary cells Ce1 to Ce4. For this reason, a discharge resistor or a switch for equalization may not be provided separately from the secondary cell state detector 1, and a cost reduction may be attempted.

In the above-described eighth embodiment, a resistor of an LPF is used as the resistor Rd. However, the invention is not limited thereto. A circuit protection resistor may be used.

Further, the above-described embodiments merely illustrate representative embodiments of the invention, and the invention is not restricted to the embodiments. That is, the embodiments may be variously modified and implemented within a range not departing from the subject matter of the invention.

REFERENCE SIGNS LIST 1 secondary cell state detector
5 MCU (first switch control unit, second switch control unit, and equalization unit)
6 differential amplifier circuit
7 cell monitoring IC (cell state detecting unit)
Ce1 to Ce4 secondary cell
Co1 first condenser
Co11 to Co14 first condenser
Co2 second condenser
Co21 to Co24 second condenser
SW11, SW12 first switch
SW111 to SW114 first switch
SW121 to SW124 first switch
SW21 to SW24 second switch
SW31 to SW34 second switch SW41 to SW44 second switch
SW51, SW52 third switch
SW71 to SW74 third switch
SW81 to SW84 third switch
Rd resistor

What is claimed is:

1. A secondary cell state detector comprising:
   a plurality of secondary cells connected to one another in series, each of the secondary cells includes a one-side electrode and an other-side electrode;
   a first condenser and a second condenser, each of which has a one-side plate and an other-side plate, each of the one-side plates is connected to the one-side electrode of each of the plurality of secondary cells;
   a first switch selectively connecting the other-side electrode of each of the secondary cells to the other-side plate each of the first condenser and the second condenser;
   a first switch control unit controlling the first switch to connect the other-side electrode of each of the secondary cells to the other-side plate of the first condenser when the plurality of secondary cells is in a first state, and then connect the other-side electrode of each of the secondary cells to the other-side plate of the second condenser when the plurality of secondary cells is in a second state;
   a differential amplifier circuit outputting a differential voltage of voltages of the other-side plates of the first condenser and the second condenser; and
   a cell state detecting unit detecting a state of each of the secondary cells based on the differential voltage.

2. The secondary cell state detector according to claim 1, further comprising:
   second switches selecting one of the plurality of secondary cells; and
   a second switch control unit controlling the second switches to connect the one-side electrode of the one selected secondary cell to the one-side plates of both the first condenser and the second condenser,
   wherein the first switch control unit connects the other-side electrode of the one secondary cell selected by the second switches to the other-side plate of the first condenser when the plurality of secondary cells is in the first state, and then connects the other-side electrode of the one secondary cell selected by the second switches to the other-side plate of the second condenser when the plurality of secondary cells is in the second state.

3. The secondary cell state detector according to claim 2, further comprising:
   an equalization unit equalizing electrode-to-electrode voltages of the plurality of secondary cells by controlling the first switch and the second switches to allow an electric charge to transfer among the plurality of secondary cells using the first condenser or the second condenser.

4. The secondary cell state detector according to claim 2, wherein one side end of the second switch is connected to the other-side electrodes of the plurality of secondary cells, respectively, and the other-side end of the second switch is connected in common to the first switch, and wherein the secondary cell state detector further includes:
   resistors connected between the second switches and the secondary cells, respectively; and
   an equalization unit performing equalization by controlling the second switches such that both electrodes of the secondary cells having a high voltage are connected to both ends of the second switches.

5. A secondary cell state detector comprising:
   a plurality of secondary cells connected to one another in series, each of the secondary cells includes a one-side electrode and an other-side electrode;
   a plurality of first condensers corresponding to the plurality of secondary cells and a plurality of second condensers corresponding to the plurality of secondary cells, each of the first and second condensers includes a one-side plate and an other-side plate, the one-side plate of each of the first condensers is connected to the one-side electrode of the corresponding secondary cell, and the one-side plate of each of the second condensers is connected to the one-side electrode of the corresponding secondary cell;
   a plurality of first switches corresponding to the plurality of secondary cells to connect the other-side electrode of a corresponding secondary cell among the plurality of secondary cells to the other-side plates of the first condenser and the second condenser;
   a first switch control unit controlling each of the first switches to connect the other-side electrode of the corresponding secondary cell to the other-side plate of a corresponding one of the first condensers when the plurality of secondary cells is in a first state, and then connect the other-side electrode of the corresponding secondary cell to the other-side plate of a corresponding one of the second condensers when the plurality of secondary cells is in a second state;
   a differential amplifier circuit outputting a differential voltage of voltages of the other-side plates of each of the first condensers and each of the second condensers; and
   a cell state detecting unit detecting a state of each of the secondary cells based on the differential voltage.

6. The secondary cell state detector according to claim 1, further comprising:
   third switches provided between the first condenser and the second condenser, and the differential amplifier circuit,
   wherein the first switch control unit controls the third switches to control the first switch with the first condenser and the second condenser circuit being disconnected from the differential amplifier, and controls the third switches to connect the differential amplifier circuit to the first condenser and the second condenser with the both plates of the first condenser and the second condenser being disconnected from the secondary cell.

* * * * *